United States Patent [19]

Saka et al.

[11] Patent Number: 5,532,431
[45] Date of Patent: Jul. 2, 1996

[54] SEALING CONSTRUCTION FOR ELECTRICAL CONNECTION BOX AND METHOD FOR FORMING PACKING USED THEREFOR

[75] Inventors: Yuuji Saka; Hideki Goto, both of Yokkaichi, Japan

[73] Assignee: Sumitomo Wiring Systems, Ltd., Yokkaichi, Japan

[21] Appl. No.: 251,258

[22] Filed: May 31, 1994

[30] Foreign Application Priority Data

Jul. 23, 1993 [JP] Japan ................. 5-182828

[51] Int. Cl.[6] ........................................ H05C 5/06
[52] U.S. Cl. .................. 174/52.3; 215/341; 220/226
[58] Field of Search .................. 174/52.1, 52.2, 174/52.3, 52.5; 215/341, 342, 343, 346, 348, 351, 352; 220/378, 226, 228

[56] References Cited

U.S. PATENT DOCUMENTS

| | | | |
|---|---|---|---|
| 3,685,682 | 8/1972 | Frey, III | 220/46 R |
| 4,149,650 | 4/1979 | Whelchel et al. | 220/201 |
| 4,570,811 | 2/1986 | Lecinski et al. | 215/343 |
| 4,599,484 | 7/1986 | Bramwell | 174/52 R |
| 5,317,462 | 5/1994 | Kakizaki et al. | 174/52.3 X |

FOREIGN PATENT DOCUMENTS

| | | |
|---|---|---|
| 504111 | 4/1937 | United Kingdom . |
| 2051975 | 1/1981 | United Kingdom . |
| 2120220 | 11/1983 | United Kingdom . |
| 2269485 | 2/1994 | United Kingdom . |

*Primary Examiner*—Kristine L. Kincaid
*Assistant Examiner*—Christopher Horgan
*Attorney, Agent, or Firm*—Greenblum & Bernstein

[57] ABSTRACT

A sealing construction for an electrical connection box, in which a waterproof cover is mounted on a main body, including a packing which is fitted into a packing groove of the waterproof cover so as to be brought into pressing contact with a contact portion of the main body; the packing being formed by hardening liquid packing compound injected directly into the packing groove of the waterproof cover, and a method of forming the packing.

2 Claims, 4 Drawing Sheets

SEALING CONSTRUCTION FOR ELECTRICAL CONNECTION BOX AND METHOD FOR FORMING PACKING USED THEREFOR

BACKGROUND OF THE INVENTION

The present invention relates to a sealing construction for an electrical connection box which is connected to a wiring harness for a motor vehicle so as to perform branching of a circuit and a method of forming a packing used for the sealing construction.

An electrical connection box used for connecting a wiring harness for a motor vehicle to various electrical components through branching, for example, a junction box is arranged to reasonably and economically connect a wire through branching by concentrating branch connection points at one spot. In response to the recent rise of density of wires of the wiring harness, various types of electrical connection boxes have been developed.

In a known electrical connection box shown in FIG. 1, a circuit 2 and a casing 3 are accommodated in a rectangular main body 1 having a pair of locking portions 5b. A waterproof cover 4 having a pair of locking portions 5a engageable with the locking portions 5b is mounted on the main body 1 so as to be locked to the main body 1 through engagement of the locking portions 5a with the locking portions 5b of the main body 1. Meanwhile, as shown in FIG. 2, a packing 6 in a packing groove 4a of the waterproof cover 4 is brought into contact with a contact portion, i.e., an upper edge 1a of an outer peripheral wall of the main body 1 so as to waterproof the main body 1.

As shown in FIG. 3, the packing 6 is formed into an annular shape by cutting a continuous rubber string to a predetermined length and then, bonding opposite ends 6a of the cut rubber string to each other by adhesive. Meanwhile, several markings a for inspecting twist of the packing 6 are placed on a surface of the packing 6. Subsequently, the packing 6 is mounted on a jig (not shown) and then, the waterproof cover 4 is set to the jig such that the packing 6 is fitted into the packing groove 4a of the waterproof cover 4. Thereafter, the waterproof cover 4 is removed from the jig in a state where the packing 6 is fitted in the packing groove 4a. Then, by observing the markings a, it is inspected whether or not the packing 6 fitted in the packing groove 4a is twisted. If it is found that the marking a does not exist at a marking location, the packing 6 is twisted and thus, mounting of the packing 6 on the waterproof cover 4 is performed again.

However, in order to mount the packing 6 on the waterproof cover 4, many steps of cutting the rubber string to a predetermined length, bonding the opposite ends 6a of the cut rubber string to each other by adhesive, placing the markings a on the packing 6, mounting the packing 6 on the jig, setting the waterproof cover to the jig, removing the waterproof cover 4 from the jig and inspecting twist of the packing 6 are required to be performed.

This many operational steps lead to a time-consuming and troublesome operation, low working efficiency and high production cost. Meanwhile, since operation of mounting the packing 6 on the jig and then, inserting the packing 6 into the packing groove 4a should be performed manually, such a case may happen that sealing performance of the known electrical connection box becomes unstable due to insufficient insertion of the packing 6 into the packing groove 4a, etc.

SUMMARY OF THE INVENTION

Accordingly, an essential object of the present invention is to provide, with a view to eliminating the above mentioned drawbacks of prior art, a sealing construction for an electrical connection box, which can be not only produced at low cost but installed in the electrical connection box easily with reduced manpower and has stable sealing performance, and a method of forming a packing used for the sealing construction.

In order to accomplish this object of the present invention, a sealing construction for an electrical connection box, in which a waterproof cover is mounted on a main body, according to the present invention comprises: a packing which is fitted into a packing groove of the waterproof cover so as to be brought into pressing contact with a contact portion of the main body; the packing being. formed by hardening liquid packing compound injected directly into the packing groove of the waterproof cover.

A width of a corner portion of the packing groove is larger than that of the remaining portion of the packing groove.

Furthermore, the present invention employs a method of forming a packing fitted into a packing groove of a waterproof cover of an electrical connection box in which the waterproof cover is mounted on a main body such that the packing is brought into pressing contact with a contact portion of the main body, comprising the steps of: injecting liquid packing compound directly into the packing groove of the waterproof cover from an automatic feeder travelling along the packing groove; and hardening the liquid packing compound.

In this method, a flow rate of the liquid packing compound discharged into the packing groove from the automatic feeder is set at a constant value and a travelling speed of the automatic feeder is lowered at a corner portion of the packing groove. In addition, a width of the corner portion of the packing groove is larger than a width of the remaining portion of the packing groove such that the packing has an identical height at the corner portion and the remaining portion of the packing groove.

In the present invention, the liquid packing compound is directly injected into the packing groove of the waterproof cover mounted on the main body from an injection nozzle of the automatic feeder under automatic control utilizing a robot, etc. and then, is hardened in the packing groove. Thus, the packing is formed in a state where the packing is fitted into the packing groove.

Meanwhile, in the present invention, the packing groove of the waterproof cover has a shape of a rectangular loop and the width of the corner portions of the packing groove is made larger than that of the remaining straight portions of the packing groove so as to increase volume of the corner portions of the packing groove.

Assuming that the corner portions and the straight portions of the packing groove have an identical width when flow rate of the packing compound discharged from the injection nozzle under automatic control utilizing the robot, etc. is constant, travelling speed of the injection nozzle drops at the corner portions of the packing groove, so that quantity of the packing compound discharged at the corner portions of the packing groove is larger than that at the straight portions of the packing groove where the injection nozzle travels at high speed and thus, the packing compound at the corner portions of the packing ground becomes higher than that at the straight portions of the packing groove. As a result, when the packing in the packing groove of the waterproof cover is brought into contact with the contact portion of the main body, the higher packing at the corner portions of the packing groove is compressed more than the lower packing at the straight portions of the packing groove and thus, restoring property of the packing at the corner portions of the packing groove deteriorates, thereby resulting in deterioration of sealing performance of the packing at the corner portions of the packing groove.

In the present invention, since the width of the corner portions of the packing groove is made larger than that of the straight portions of the packing groove for the above mentioned reason so as to increase volume of the corner portions of the packing groove, the packing compound at the corner portions and the straight portions of the packing groove have an identical height such that sealing performance of the packing at the corner portions of the packing groove is stabilized.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views off the accompanying drawings.

DETAILED DESCRIPTION OF THE INVENTION

Figure 4:
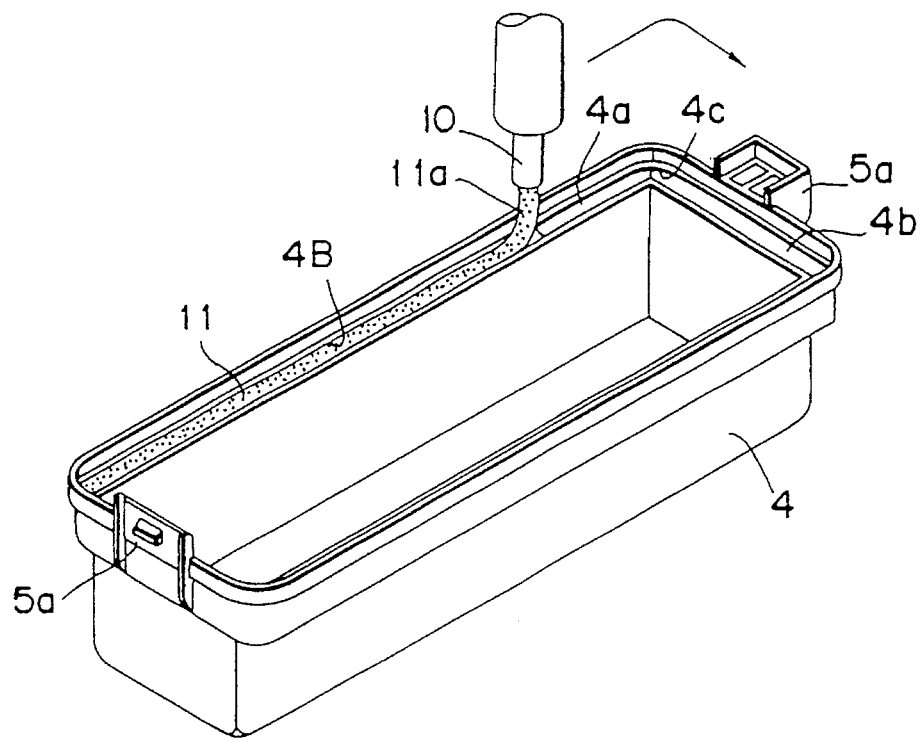
FIG. 4 is a perspective view showing injection of packing compound into a waterproof cover of an electrical connection box having a sealing construction according to the present invention.
Figure 5:
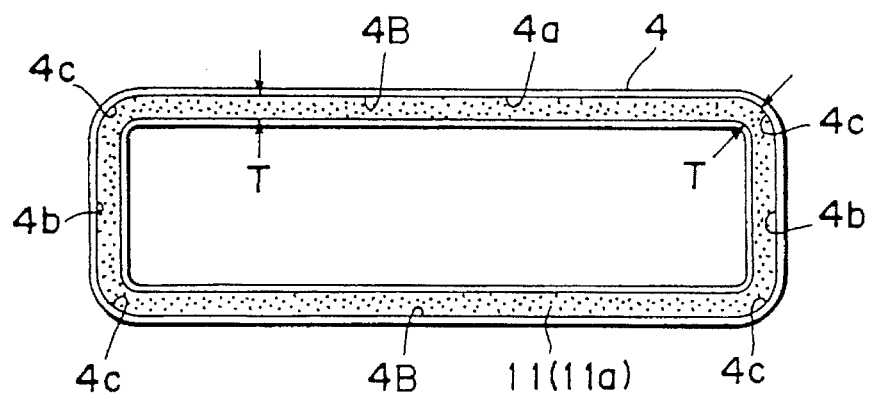
FIG. 5 is a top plan view of a packing groove of the waterproof cover of FIG. 4.
Figure 7:
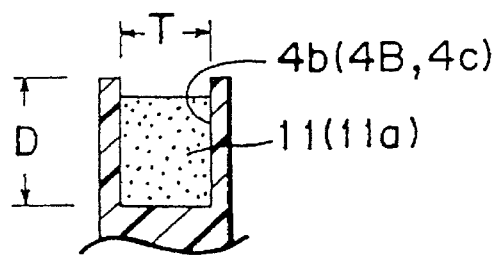
FIG. 7 is a sectional view of the packing groove of the waterproof cover of FIG. 5.
Figure 8:
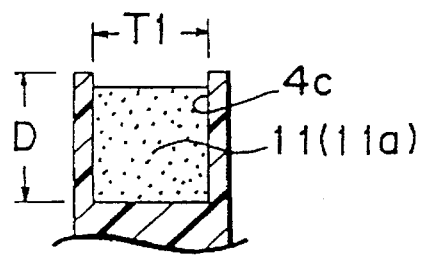
FIG. 8 is a sectional view of corner portions of the packing groove of the waterproof cover of FIG. 6.

Referring now to the drawings, there is shown in FIGS. 4 and 5, a waterproof cover 4 of an electrical connection box having a sealing construction according to one embodiment of the present invention. A packing groove 4a of the waterproof cover 4 has a shape of a rectangular loop and has a pair of opposite end portions 4b, a pair of opposite side portions 4B and four corner portions 4c. As shown in FIG. 7, the opposite side portions 4b, the opposite side portions 4B and the corner portions 4c have an identical depth D of, for example, 5 mm and an identical width T of, for example, 3 mm.

Figure 1:
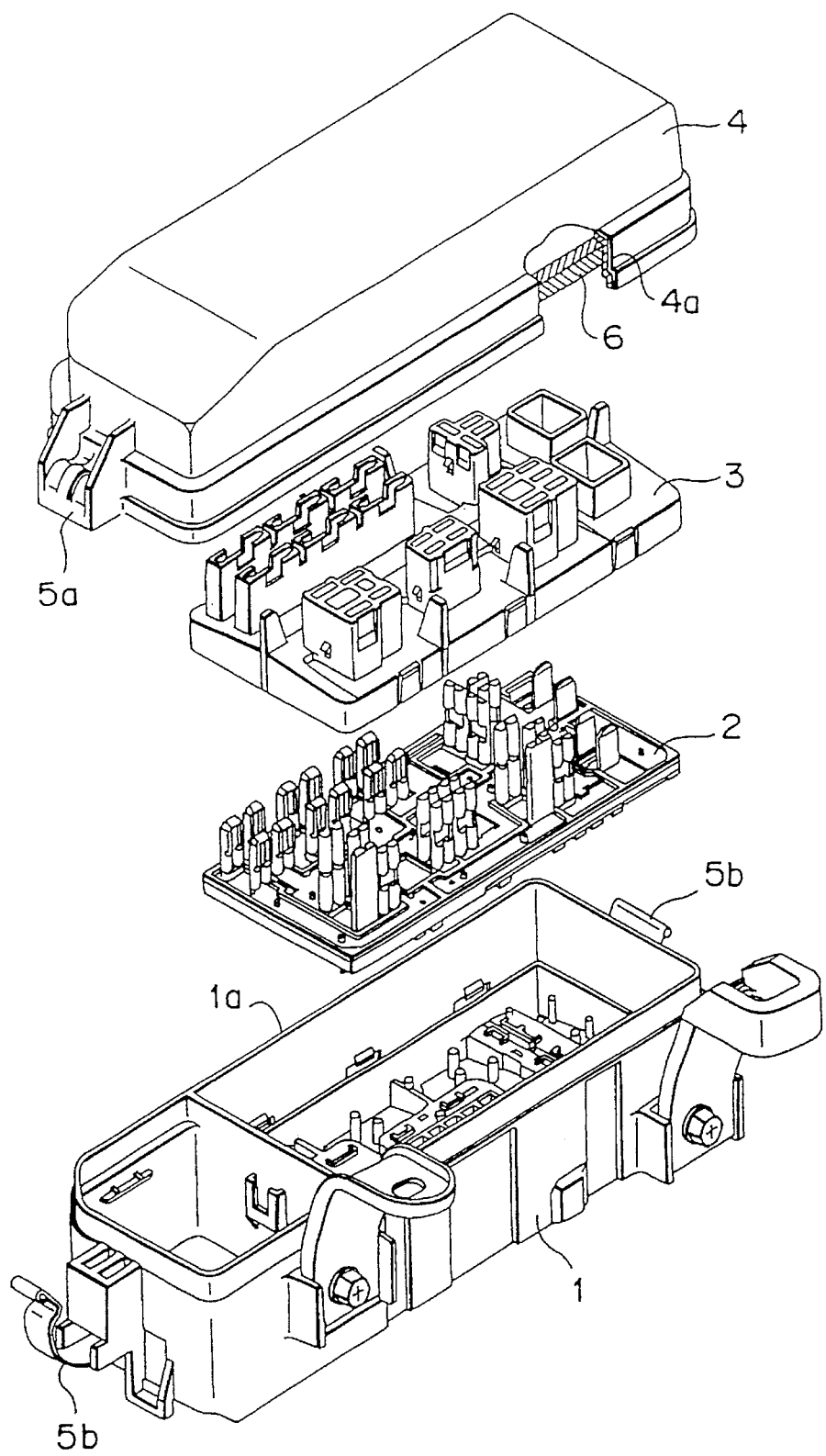
FIG. 1 is an exploded perspective view of a prior art electrical connection box (already referred to)
Figure 2:
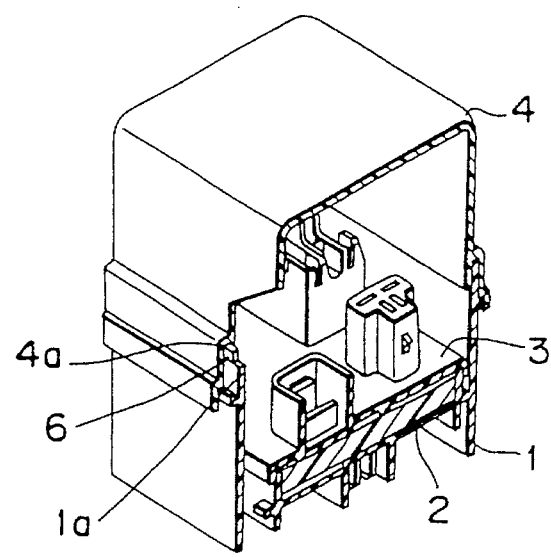
FIG. 2 is a partially cutaway perspective view of the prior art electrical connection box of FIG. 1 (already referred to)
Figure 3:
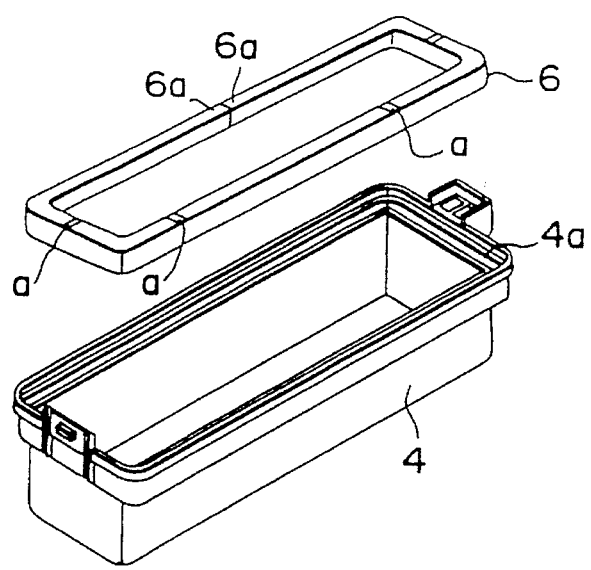
FIG. 3 is a perspective view showing insertion of a packing into a waterproof cover of the prior art electrical connection box of FIG. 1 (already referred to)

Meanwhile, in order to prevent interference of mating locking projections (not shown but corresponding to locking projections 5b of a known main body 1 of FIG. 1) of the locking portions 5a with an outer peripheral wall of the waterproof cover 4 at the opposite end portions 4b, the outer peripheral wall of the waterproof cover 4 is recessed at the locking projections 5a as shown in FIG. 4.

On the other hand, an injection nozzle 10 of an automatic feeder under automatic control is programmed so as to travel along the rectangular packing groove 4a of the waterproof cover 4. The injection nozzle 10 is also programmed so as to discharge liquid packing compound 11a, for example, foamed silicone, foamed polyurethane or the like. After having been discharged from the injection nozzle 10, the packing compound 11a is adapted to be hardened spontaneously or by heating.

When the packing compound 11a is injected into the packing groove 4a of the waterproof cover 4 by the injection nozzle 10, the injection nozzle 10 is displaced along the rectangular packing groove 4a while the packing compound 11a is being discharged from the injection nozzle 10. As a result, the packing compound 11a is directly injected into the packing groove 4a and then, is hardened into a packing 11 spontaneously or by heating.

By the above described sealing construction of the present invention, since the previously required steps of bonding opposite ends of the packing to each other, placing markings on the packing and inspecting twist of the packing are not required to be performed, the sealing construction can be produced at low cost. Meanwhile, since injection of the packing compound 11a can be subjected to automatic control utilizing a robot, etc., conventional operations of fitting the packing into a jig and inserting the packing into the packing groove of the waterproof cover are not required to be performed and thus, manpower can be reduced greatly. Furthermore, since such an undesirable conventional phenomenon as insufficient insertion of the packing into the packing groove does not take place, sealing performance of the sealing construction is also stabilized.

Meanwhile, in case the discharge rate of the packing compound 11a from the injection nozzle 10 under automatic control utilizing a robot, etc. is constant and the opposite end portions 4b, the opposite side portions 4B and the corner portions 4c of the packing groove 4a have the identical width T, travelling speed of the injection nozzle 10 drops at the corner portions 4c, so that the quantity of the packing compound 11a discharged at the corner portions 4c is increased as compared with that of the opposite end portions 4b and the opposite side portions 4B having high travelling speed of the injection nozzle 10 and thus, the packing compound 11a becomes higher at the corner portions 4c than at the opposite end portions 4b and the opposite side portions 4B. As a result, when the packing 11 in the packing groove 4a of the waterproof cover 4 is brought into contact with an upper edge of an outer peripheral wall of a main body (not shown but corresponding to an upper edge 1a of an outer peripheral wall of the known main body 1 of FIG. 1) of the electrical connection box, the higher packing 11 at the corner portions 4c are compressed more than the lower packing 11 at the opposite end portions 4b and the opposite side portions 4B, so that restoring property of the packing 11 at the corner portions 4c deteriorates, thereby resulting in deterioration of sealing performance of the packing 11 at the corner portions 4c.

Meanwhile, when the injection nozzle 10 is controlled so as to travel at a constant travelling speed, the injection nozzle 10 may be fed through the opposite end portions 4b and the opposite side portions 4B at a travelling speed identical with that at the corner portions 4c. However, in this case, the period required for injecting the packing compound 11a into the packing groove 4a is lengthened. Meanwhile, if the injection nozzle 10 is controlled such that quantity of the packing compound 11a discharged from the injection nozzle 10 is lessened at the corner portions 4c, the program becomes complicated.

Figure 6:
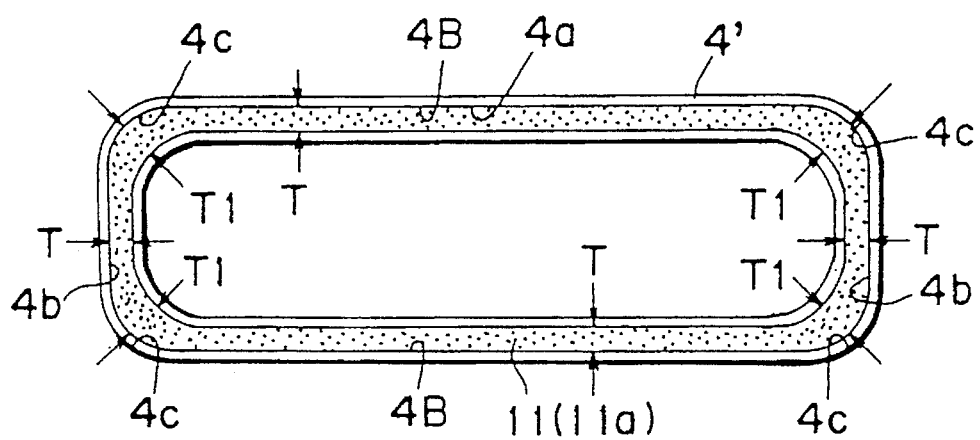
FIG. 6 is a view similar to FIG. 5, particularly showing its modification.

FIG. 6 shows a waterproof cover 4' which is a modification of the waterproof cover 4 of FIG. 5. In the waterproof cover 4', the opposite end portions 4b and the opposite side portions 4B have the width T and the depth D in the same manner as in the waterproof cover 4 of FIG. 7 but the corner portions 4c are made wider than the opposite end portions 4b and the opposite side portions 4B so as to have a width T1 (T1>T) and the depth D such that volume of the corner portions 4c is increased. For example, when travelling speed of the injection nozzle 10 at the corner portions 4c is set 20 to 30% lower than that at the opposite end portions 4b and the opposite side portions 4B, the quantity of the packing compound 11a discharged from the injection nozzle 10 at the corner portions 4c is 1.2 to 1.3 times that at the opposite end portions 4b and the opposite side portions 4B. Therefore, if the width T1 of the corner portions 4c is increased to 3.6 to 3.9 mm when the width T of the opposite end portions 4b and the opposite side portions 4B is 3 mm, the volume of the corner portions 4c increases by 20 to 30%. As a result, the height of the packing compound 11a in the packing groove 4a becomes uniform and thus, sealing performance of the packing 11 at the corner portions 4c is stabilized. In order to increase the width T1 of the corner portions 4c, such a technique, for example, may be employed that curvature of an inner peripheral wall at the corner portions 4c is increased.

As is clear from the foregoing description of the sealing construction of the present invention, the liquid packing compound is directly injected into the packing groove of the waterproof cover by the injection nozzle under automatic control utilizing a robot, etc. and then, is hardened in the packing groove. Accordingly, since the previously required steps of bonding the opposite ends of the packing to each other, placing markings on the packing and inspecting twist of the packing are not required to be performed, the sealing construction can be produced at low cost. Meanwhile, since injection of the packing compound can be subjected to automatic control utilizing a robot, etc., conventional operations of fitting the packing into the jig and inserting the packing into the packing groove of the waterproof cover are not required to be performed, thereby resulting in a great reduction of manpower. Furthermore, since such an undesirable conventional phenomenon as insufficient insertion of the packing into the packing groove does not take place, sealing performance of the sealing construction is also stabilized.

Moreover, in the modified sealing construction of the present invention, since the volume of the corner portions of the packing groove is increased by increasing the width of the corner portions of the packing groove, the height of the packing compound is made uniform in the packing groove and thus, sealing performance of the packing at the corner portions of the packing groove is stabilized.

What is claimed is:

1. A sealing construction for an electrical connection box, in which a waterproof cover is mounted on a main body, comprising:

a packing which is fitted into a packing groove of the waterproof cover so as to be brought into pressing contact with a contact portion of the main body;

the packing being formed by hardening liquid packing compound injected directly into a packing groove of the waterproof cover; and a width of a corner portion of the packing groove being larger than a width of the remaining portion of the packing groove.

2. A method of forming a packing fitted into a packing groove of a waterproof cover of an electrical connection box in which the waterproof cover is mounted on a main body such that the packing is brought into pressing contact with a contact portion of the main body, comprising the steps of:

injecting liquid packing compound directly into the packing groove of the waterproof cover from an automatic feeder travelling along the packing groove, a flow rate of the liquid packing compound discharged into the packing groove from the automatic feeder being set at a constant value and a travelling speed of the automatic feeder being lowered at a corner portion of the packing groove; and a width of the corner portion of the packing groove being larger than a width of a remaining portion of the packing groove such that the packing has an identical height at the corner portion and the remaining portion of the packing groove.

* * * * *

UNITED STATES PATENT AND TRADEMARK OFFICE
CERTIFICATE OF CORRECTION

PATENT NO. : 5,532,431
DATED : July 2, 1996
INVENTOR(S) : Y. SAKA et al.

It is certified that error appears in the above-indentified patent and that said Letters Patent is hereby corrected as shown below:

On the title page, in section [56], "References Cited", "U.S. PATENT DOCUMENTS", insert ---4,781,621  11/1988  Sugiyama et ai.  439/559---.

At column 6, line 25 (claim 1, line 11), change "the" (first occurrence) to ---a---.

Signed and Sealed this

Twenty-ninth Day of October 1996

Attest:

BRUCE LEHMAN

*Attesting Officer*  *Commissioner of Patents and Trademarks*